May 12, 1925. 1,537,075
A. L. FREEDLANDER ET AL
FAN BELT
Filed April 2, 1923  2 Sheets-Sheet 1
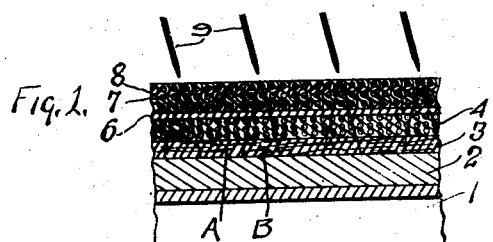
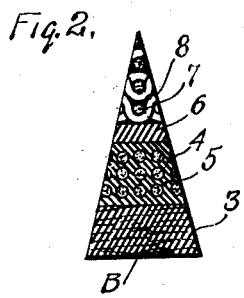
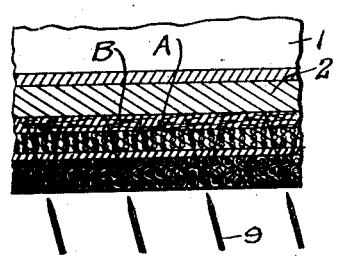
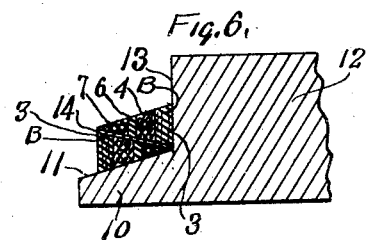
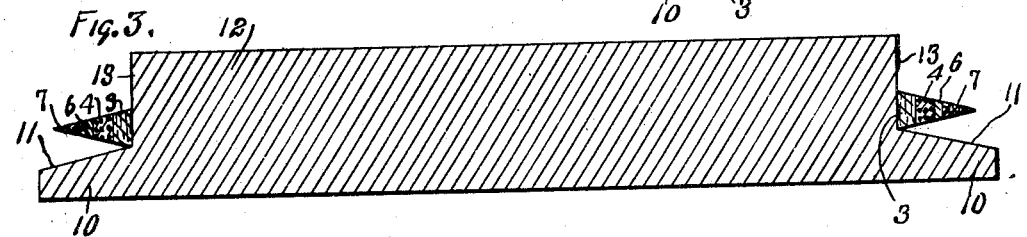
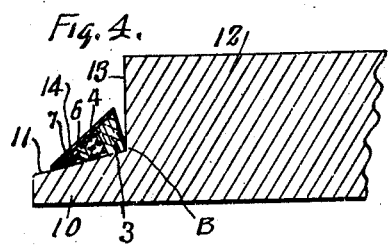
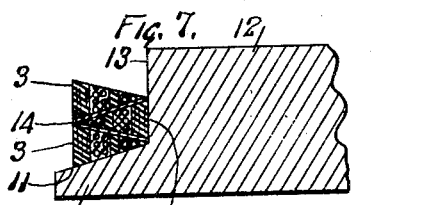
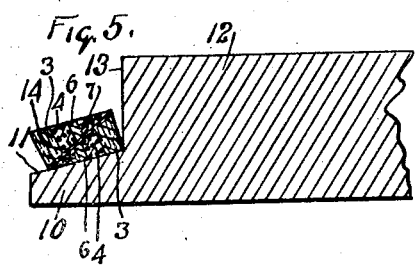
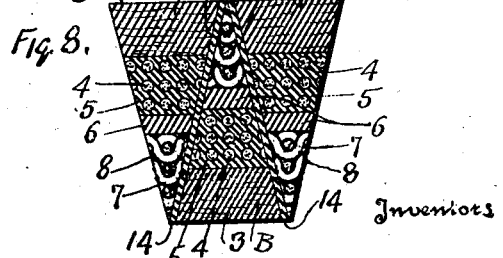
Inventors
Abraham L. Freeedlander,
William G. Goodwin,
By Toulmin & Toulmin
Attorneys

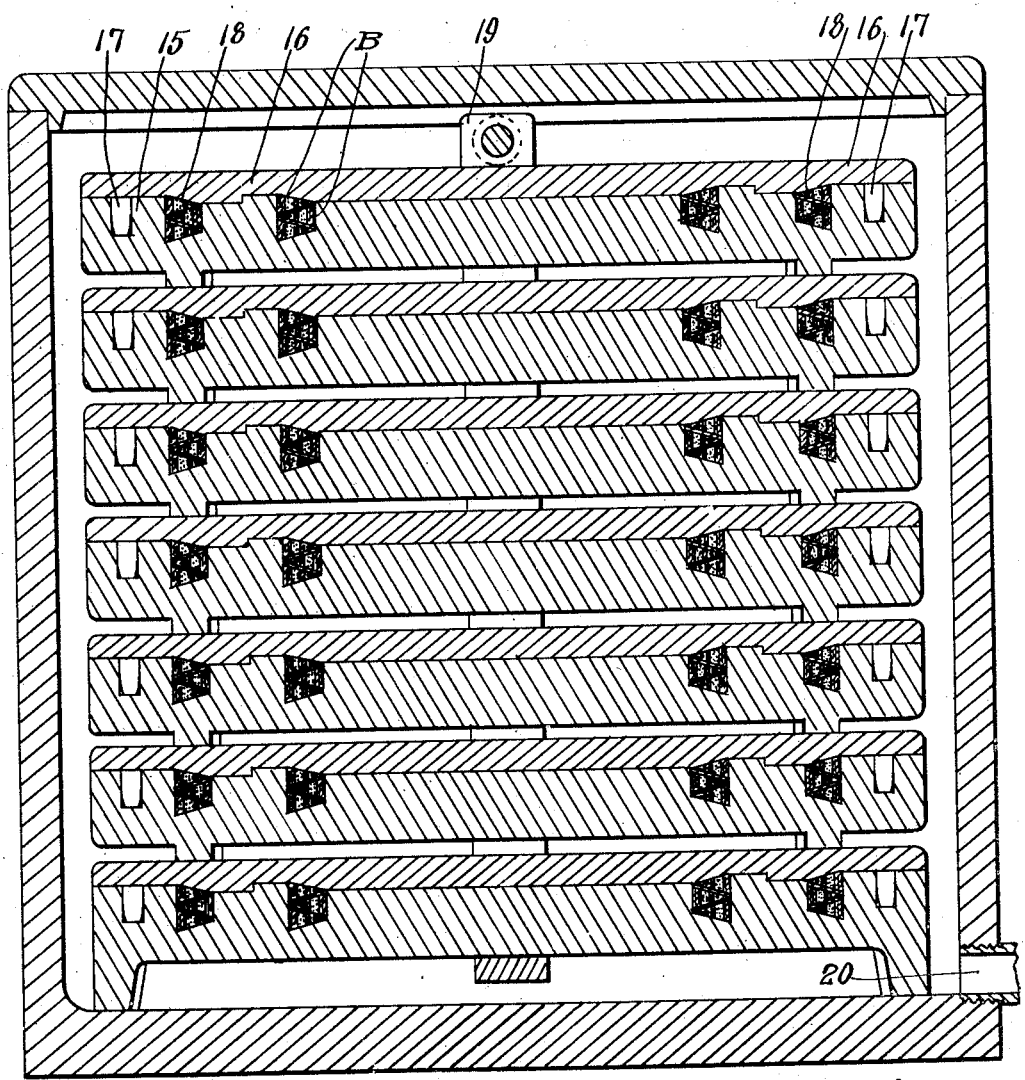

Patented May 12, 1925.

1,537,075

UNITED STATES PATENT OFFICE.

ABRAHAM L. FREEDLANDER AND WILLIAM G. GOODWIN, OF DAYTON, OHIO, ASSIGNORS TO THE RUBBER DEVELOPMENT COMPANY, OF DAYTON, OHIO, A TRUST ESTATE.

FAN BELT.

Application filed April 2, 1923. Serial No. 629,255.

*To all whom it may concern:*

Be it known that we, ABRAHAM L. FREEDLANDER and WILLIAM G. GOODWIN, citizens of the United States, residing at Dayton, in the county of Montgomery and State of Ohio, have invented certain new and useful Improvements in Fan Belts, of which the following is a specification, reference being had therein to the accompanying drawing.

Our invention relates to belts and the method of making belts.

The object of our invention is to provide a fan belt of long life and durability, with sufficient resiliency and a capacity to stand abuse and wear and the deteriorating effects of mud, water, and oil.

It is the particular object of our invention to provide a belt adapted for use with V-shaped pulleys on automotive equipment.

It is the object of our invention to provide a composite belt which may be assembled from a plurality of separate sections. These sections may be cut for the purpose of forming this belt, or may be waste from forming larger belts of a different construction.

It is our object to provide a belt in which the several sections will tenaciously adhere to one another, which will withstand the abrasive effect of the pulleys on which it is mounted, will closely engage with such pulleys, and which will have such yielding surfaces as will provide proper compression areas to yieldingly take up the strains and stresses to which such structures are subjected.

Referring to the drawings:

Figure 1 is a section showing the production of the segments which later compose the belt of our invention, in a case when such segments are otherwise waste material from the production of belts of different construction.

Figure 2 is an enlarged section of a typical segment or unit composing the belt.

Figure 3 is a section through such a segment as applied on the assembly mandrel in the first step of the assembly.

Figure 4 is a similar section in the second step of the assembly.

Figure 5 is a similar section showing the application of the second segment or unit to compose the belt.

Figure 6 is the next step in the assembly of the components of the belt.

Figure 7 is the final step.

Figure 8 is a section enlarged, showing the composite belt.

Figure 9 is a section through a vulcanizing equipment, illustrating the arrangement of different sizes of belts being subjected to a second vulcanization.

Referring to the drawings in detail:

1 is a metal drum on which there is mounted a cutting pad 2. Upon this cutting pad is mounted a cylinder of belt stock. This cylinder of belt stock is composed of the following successive layers, in the order enumerated, reading inwardly toward the outside of the stock as mounted on the drum. The first component of this stock is a layer of stiflex, containing fibre preferably, designated 3. This material is a very stiff rubber compound. Mounted upon the stiflex 3 are three layers of rubberized cords which are designated 4. These cords are parallel to the main axis of the segment or section, and run around through the section, forming a backbone for it. The rubber which is intermingled with and interposed between the cords is designated 5. Mounted on the rubberized cords is a red rubber cushion 6. Upon the cushion are mounted three layers of rubberized fabric, the textile portion of which is designated 7 and the rubber portion 8. This fabric has the strands composing it running in directions at right angles to one another, thus forming a mat.

It will be understood that this stock is vulcanized ready for use prior to being put upon the metal drum to be cut into sections.

The sections designated A are cut by the knives 9, which form solid belts. This leaves triangular-shaped sections B as waste, the use of which is the primary purpose of this invention.

We take these triangular segments or sections B which come off of the metal cutting drum in rings, and assemble them in the following manner, thus securing not only a saving of the waste, but a belt of new and durable characteristics not heretofore obtainable.

We select an assembly mandrel such as shown in Figure 3 in section, which is composed of a ledge or shoulder 10, having a downwardly tapering surface 11. The main body of the mandrel is designated 12. The broad base of one of these segments B is mounted on the wall 13 of the main body 12 of the assembly mandrel. It is then forced downwardly so that it lies closely adjacent to the surface 11 of the shoulder 10, and a layer of, preferably, white rubber, acting as a bond or cement, designated 14, is placed thereon, as in Figure 5. This cement has superimposed upon it a second segment B having its sharp point adjacent the wall 13 of the mandrel 12. This whole structure is then removed from the mandrel and reversed in position, as in Figure 6.

A third segment B is then cemented in position, so that the outer sections have the stiflex portions on the same side of the belt with the fabric portion of the middle section interposed therebetween. It will also be noted that the stiflex portion 3 of the middle section is interposed between the fabric portions on either side thereof of the outside sections.

We thus have a belt which has a compression or yielding member, which is the stiflex portion of the center section on the inner surface of the belt, which is subjected to considerable compression, while this yielding section is protected by the fabric sections, and by fabric with intermingled cord and fabric portions. The several sections are bonded together by the bond or cement of white rubber 14, and have cushion members to absorb the compression, distributing it through the structure, in the form of the red rubber cushion 6.

It will also be noted that the rubberized cord medium is centrally located and so arranged as to form the backbone of the belt.

After the production of such a composite belt, the belt is inserted in a vulcanizing apparatus, and subjected to a temperature of approximately three hundred (300) degrees Fahrenheit, for approximately thirty (30) minutes.

In Figure 10 is shown in section a typical equipment of this character, in which there are a plurality of vulcanizing chambers composed of the lower half 15 and the upper half 16, located with respect to one another by the dowel pins 17. In these halves, cavities 18 are provided for the reception of the belts. These cavities are concentric with one another, so that belts of different sizes and diameters may be accommodated in the same apparatus. These several sets of apparatus are piled one on the other, and retained together by a clamp or strap 19 in any desired manner.

Steam is applied through the vent 20 for the application of the suitable heat for the second vulcanization.

It is sometimes desirable to apply the cement to the side walls of the sections, and then stretch upon a form under heat, to bring all the sections to be assembled together to a uniform size, after which the white rubber bond can be applied.

It will be thus seen that our process consists of the following steps:
(1) Providing the vulcanized stock.
(2) Cutting the stock to form segments or rings triangular in section.
(3) Cementing the side walls of the sections.
(4) Stretching under heat on a form to bring the sections to size.
(5) Applying white rubber sheets on either side of the center section.
(6) Placing the center section on a mandrel.
(7) Applying a side section in reverse position to the center section.
(8) Removing the assembly and replacing it on the mandrel.
(9) Placing the final section on the other side of the center section.
(10) Placing in a mold and curing.

We desire to comprehend within our invention suitable modifications of the details thereof, and of the process of manufacturing our belt, which may be fairly comprehended within the scope of our invention, as such details may be modified from time to time to adapt the invention to varying conditions and demands. For instance, in place of the stiflex we may use fabric layers in place thereof, preferably embedded in rubber.

Having thus fully described our invention, what we claim as new, and desire to secure by Letters Patent, is:

1. In a belt, a plurality of units triangular in section, assembled with their side walls adjacent to one another, the point of one section being interposed between the basis of the sections on either side thereof.

2. In a belt, a plurality of annular sections, triangular in cross-section, each of said sections being composed of an outer wall of rubber, a plurality of cords embedded in rubber, traveling parallel to the major axis of the section, a rubber cushion, and a plurality of layers of fabric embedded in rubber, a portion of the strands of the fabric being arranged at an angle to the major axis of the section.

3. In a belt, a plurality of annular sections, triangular in cross-section, each of said sections being composed of an outer wall of rubber, a plurality of cords embedded in rubber, traveling parallel to the major axis of the section, a rubber cushion, and a plurality of layers of fabric embedded in rubber, a portion of the strands of the fabric being arranged at an angle to the major axis of the section: the belt being so arranged that the intermediate section will have its sharp edge interposed between the bases of the sections on either side thereof, whereby the rubber will form substantially the top and bottom walls of the belt, and the cords and fabric will form the major portion of the side walls of the belt.

4. In combination in a belt composed of three annular members, triangular in section, the point of one member being interposed between the bases of the members on either side thereof, means to cement said members to one another, each of said members being composed of a relatively thick stiff rubber base, a plurality of layers of cords traveling parallel to the major axis of the section, and embedded in rubber, a rubber cushion, and a plurality of layers of fabric embedded in rubber, whereby the relatively thick stiff bases will form substantially the outer and inner walls of the belt, while the cords and fabric will form substantially the major portion of the side walls of the belt in the area of greatest wear.

5. In combination in a belt, an outer wall of relatively stiff rubber, an inner wall of relatively stiff rubber, side walls of textile material embedded in rubber, adapted to embrace the inner section and protect it, and adapted to support the outer walls of relatively thick rubber.

6. In combination in a belt, an outer wall of relatively stiff rubber, an inner wall of relatively stiff rubber, side walls of textile material embedded in rubber, adapted to embrace the inner section and protect it, and adapted to support the outer walls of relatively thick rubber, and a cushion of rubber interposed approximately midway in said textile portions.

7. In a belt, a plurality of sections consisting of layers of fabric and cords embedded in rubber, said sections being triangular in section, with the point of a center section interposed between the bases of the adjoining sections.

In testimony whereof, we affix our signatures.

ABRAHAM L. FREEDLANDER.
WILLIAM G. GOODWIN.